US010891450B2

(12) United States Patent
Wappler

(10) Patent No.: US 10,891,450 B2
(45) Date of Patent: Jan. 12, 2021

(54) DIRECTIONAL RFID ANTENNA SYSTEM

(71) Applicant: Surgere, Inc., Green, OH (US)

(72) Inventor: William Wappler, Green, OH (US)

(73) Assignee: Surgere, Inc., Green, OH (US)

( * ) Notice: Subject to any disclaimer, the term of this patent is extended or adjusted under 35 U.S.C. 154(b) by 0 days.

(21) Appl. No.: 16/411,239

(22) Filed: May 14, 2019

(65) Prior Publication Data

US 2020/0364421 A1 Nov. 19, 2020

(51) Int. Cl.
*G06K 7/10* (2006.01)
*G06K 19/077* (2006.01)
*G06K 19/07* (2006.01)

(52) U.S. Cl.
CPC ..... *G06K 7/10316* (2013.01); *G06K 19/0723* (2013.01); *G06K 19/07773* (2013.01)

(58) Field of Classification Search
CPC .................................................. G06K 7/10316
USPC ........................................................ 235/451
See application file for complete search history.

(56) References Cited

U.S. PATENT DOCUMENTS

| 9,760,826 | B1* | 9/2017 | Stine ................ G06K 19/07773 |
| 2010/0044435 | A1* | 2/2010 | Ahlberg ............... G06K 7/0004 235/440 |
| 2016/0180123 | A1* | 6/2016 | Forster ............... G06K 19/0726 340/10.51 |
| 2017/0017874 | A1* | 1/2017 | Park ..................... C10M 135/10 |
| 2019/0311164 | A1* | 10/2019 | Teter .................. G06K 7/10415 |

* cited by examiner

*Primary Examiner* — Allyson N Trail
(74) *Attorney, Agent, or Firm* — Clements Bernard Walker; Richard A. Walker

(57) ABSTRACT

Antenna assemblies for controlling radiation patterns or backscatter sensing zones are provided. The antenna assemblies may be used in a system for identifying items, such as a radio-frequency identification (RFID) system having an RFID reader and a plurality of RFID tags. In one embodiment, an antenna assembly may include a directional antenna having a fanned-shaped radiation pattern. In addition to the directional antenna, the antenna assembly may further include a right shroud element configured to reduce a right side of the fanned-shaped radiation pattern and a left shroud element configured to reduce a left side of the fanned-shaped radiation pattern.

20 Claims, 6 Drawing Sheets

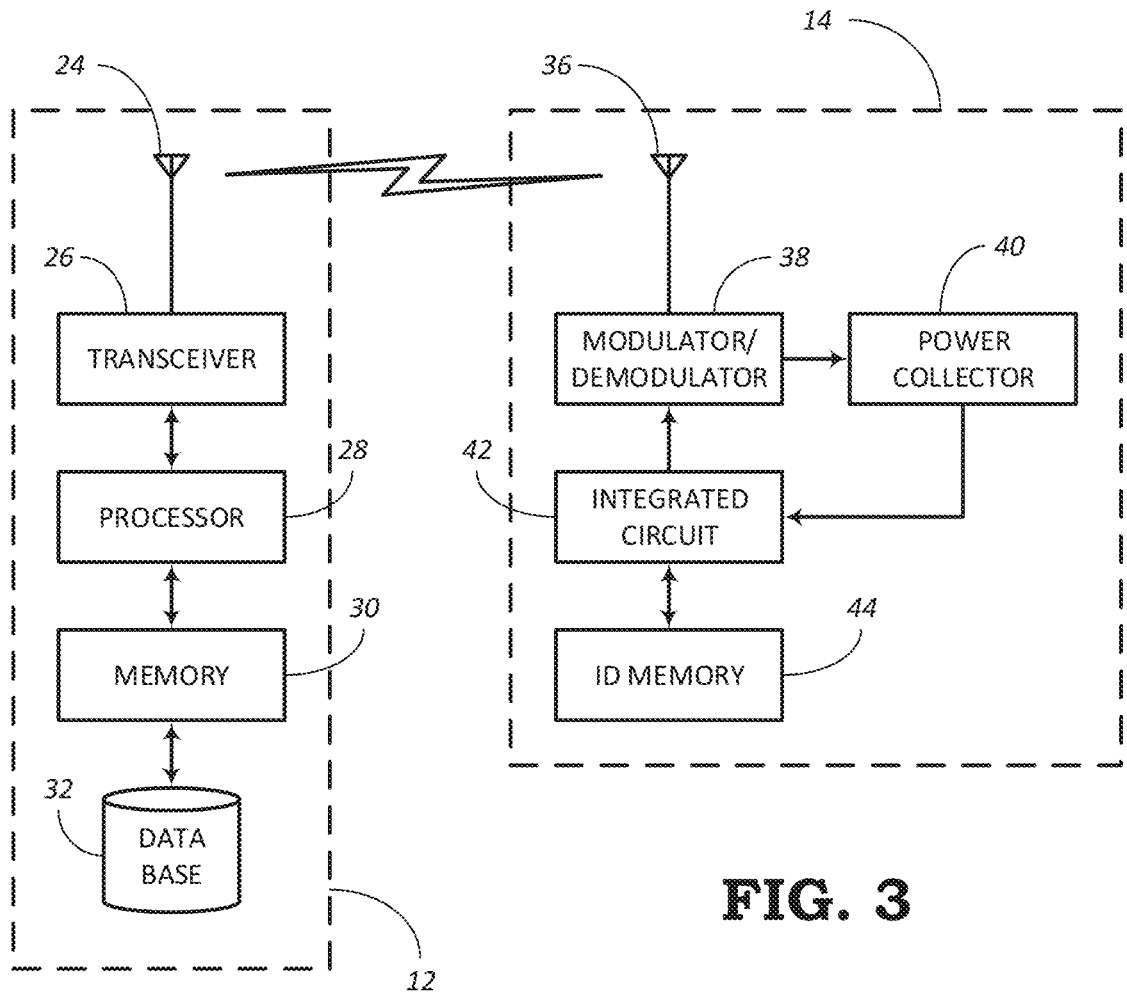

DIRECTIONAL RFID ANTENNA SYSTEM

TECHNICAL FIELD

The present disclosure generally relates to radio-frequency identification (RFID) systems. More particularly, the present disclosure relates to systems for controlling an electromagnetic radiation pattern in an RFID system.

BACKGROUND

In a warehouse setting or other environment where many items may be stored and/or managed for delivery to other locations, the processes of keeping track of inventory can be complex and time-consuming. In recent years, it has been known that inventory tracking can be accomplished more expeditiously by utilizing RFID systems. One example of such a system may include an RFID reader and multiple passive RFID tags attached to inventory items, where the RFID reader may be an active device that sends an interrogation signal to which the nearby RFID tags can respond. If an RFID tag is within range to receive the interrogation signal and if the strength of the received interrogation signal is sufficient to power the passive RFID tag, then the RFID tag can respond by a process known as backscattering whereby identification (ID) information of the RFID tag is modulated and sent back to the RFID reader. In this way, the RFID reader can identify one or more RFID tags within range.

The communication between an RFID reader and an RFID tag does not require line-of-sight transmission. Instead, the electromagnetic RFID waves (typically in the low frequency (LF), high frequency (HF), or ultra-high frequency (UHF) ranges) can pass through walls or other solid objects. In the case of an RFID tag imbedded within an item to be tracked, for example, the RFID signals can also traverse the medium of the item itself and/or can traverse other RFID tags and corresponding items.

Another aspect of RFID technology is that an RFID reader is capable of communicating with multiple RFID tags at the same time, thereby enabling a quick analysis of inventory information of multiple items, such as items that may be stored on a shelf, placed on a pallet, stored within a box, etc. Typically, many RFID readers utilize an antenna that is omni-directional, which means that the RFID reader may communicate with RFID tags in any direction with respect to the RFID reader. Although this may be an advantage in many situations, there is a need in some situations where an RFID system may operate more effectively with a restricted backscatter sensing zone to enable tracking or identifying of items only within that specific zone, as opposed to communicating with any RFID-tagged items within radio range of the RFID reader.

BRIEF SUMMARY

Systems and methods for obtaining inventory information of a plurality of items within a specific area are described in the present disclosure. According to one embodiment, a system for identifying items is provided. The system may include a radio-frequency identification (RFID) reader having a reader antenna configured to transmit an interrogation signal. The system may further include a plurality of RFID tags, where each RFID tag is configured to be attached to a respective item to be identified. Furthermore, each RFID tag may include a tag antenna configured to receive the interrogation signal and, in response to receiving the interrogation signal, provide an identification (ID) response representing an identity of the respective RFID tag. Also, the system may include a shroud assembly surrounding at least a portion of the reader antenna. The shroud assembly may be configured to reduce the size of a backscatter sensing zone defining a space from which a backscatter signal from a respective tag antenna of one or more of the RFID tags can be sensed by the reader antenna of the RFID reader.

According to another embodiment, an antenna assembly is provided in the present disclosure. The antenna assembly may include a directional antenna having a fanned-shaped radiation pattern, a right shroud element configured to reduce a right side of the fanned-shaped radiation pattern, and a left shroud element configured to reduce a left side of the fanned-shaped radiation pattern.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram illustrating a radio-frequency identification (RFID) reader of the item tracking system of FIG. 1, according to various embodiments.

FIG. 3 is a block diagram illustrating an RFID tag of one of the multiple RFID tags of the item tracking system of FIG. 1, according to various embodiments.

DETAILED DESCRIPTION

The present disclosure relates to systems and methods for limiting a radiation pattern and/or a sensing/receiving zone of an antenna assembly. More particularly, the systems of the present disclosure may be capable of limiting the radiation pattern and backscatter sensing zone of a radio frequency identification (RFID) antenna assembly used within an RFID sensing system.

One problem with conventional RFID systems is that an RAID reader may utilize an omnidirectional antenna and thereby read RFID tags anywhere near the RFD reader. If an RFID antenna is created for producing strong electromagnetic (EM) signals, the range of these EM signals may be expanded to such an extent as to reach a greater number of RFID tags than can be managed at one time and/or may include outlying MD tags that were not intended to be tracked. If the number of RFID tags providing backscatter EM signals is too great, the RFID reader may be overwhelmed with more identification (ID) information than it can handle.

Therefore, the present disclosure provides various embodiments of systems that are intended to constrain the ID capturing process to a limited zone in order to minimize unwanted reads of returned backscatter signals. Also, the limited backscatter sensing zone described in the present disclosure may minimize the amount of information received at one time and minimize the number of unneeded. ID reads. Nevertheless, although the backscatter sensing zone may be restricted, the embodiments of the present disclosure also intend to allow the RFID sensing systems to capture a large number of RFID tags at one time.

Figure 1:
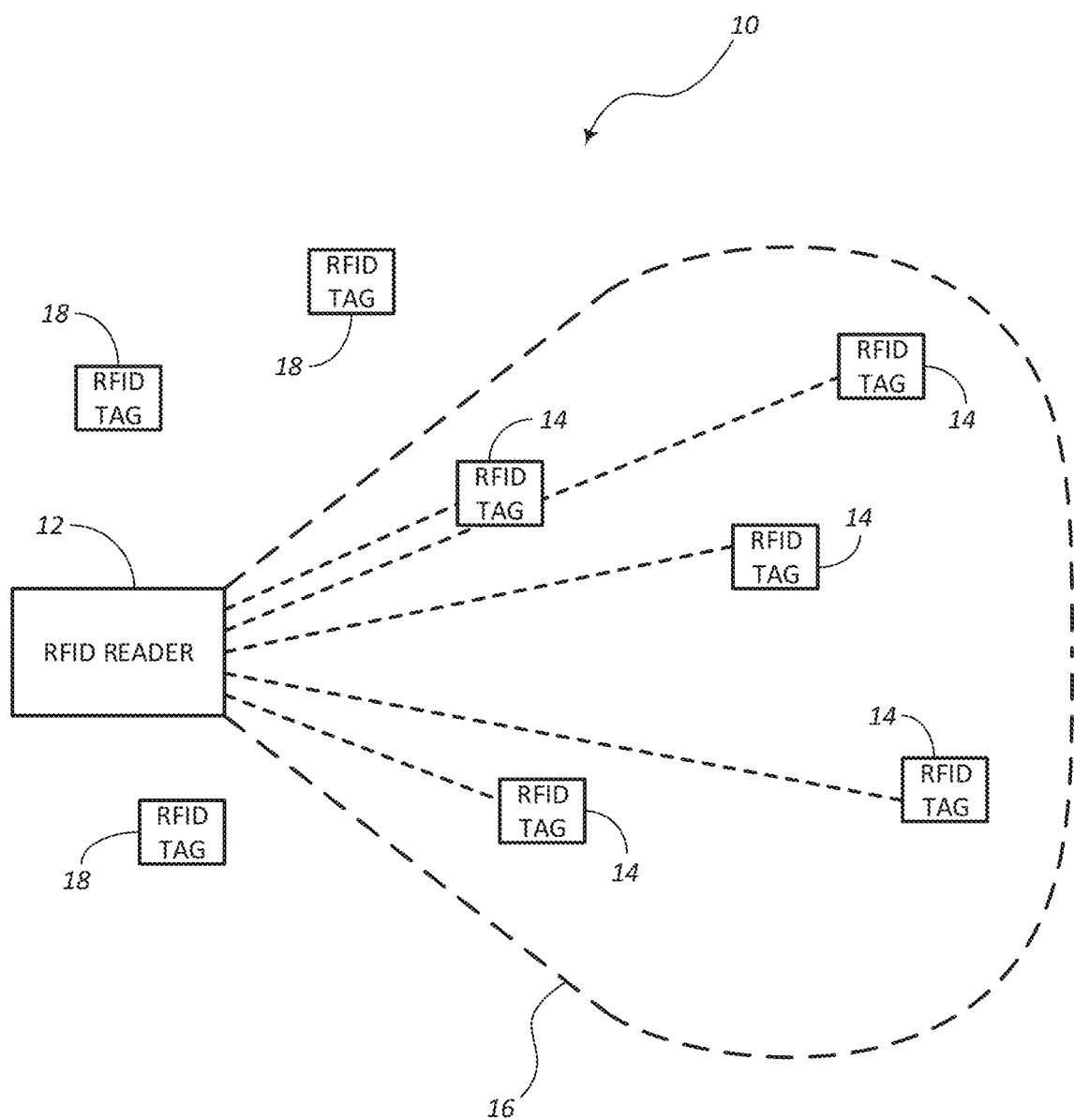
FIG. 1 is a block diagram illustrating an item tracking system, according to various embodiments of the present disclosure.

FIG. 1 is a block diagram showing an embodiment of a system 10 for identifying or tracking items. In this embodiment, the system 10 includes an RFID reader 12 (or interrogator) and a plurality of RFID tags (or RFID chips). The system 10 may be used, for example, to manage inventory items within a warehouse, where each item includes a respective RFID tag. In other implementations, the system 10 may be utilized for tracking vehicles in a transportation system, calculating bus fare and/or vehicle tolls (e.g., EZ Pass). Also, the system 10 may be used to deter theft in a retail setting, control access or entry within a restricted area, track animals having an RFID tag implanted therein, track people having an RFD tag attached to their clothing, track library resources, monitor start or finish times of runners in a race, or used within other environments.

The RFID reader 12, according to various embodiments of the present disclosure, comprises an antenna or antenna array that may not necessarily be omnidirectional, but may have a directional electromagnetic radiation pattern. In other words, RFID reader 12 may be designed to intentionally have a limited communication range and may be configured to capture ID data from only those RFID tags 14 that are located within a reading zone or sensing zone 16 as shown in FIG. 1. Although the sensing zone 16 is illustrated as a lobed-shape pattern, the sensing zone 16 may have any suitable shape, reach, width, height, etc., according to various embodiments.

With such a limited radiation pattern or sensing zone 16, RFID tags 18 outside of the sensing zone 16 may not be able to communicate with the RFID reader 12, even if the RFID reader 12 is closer in proximity to the outlying RFID tags 18 than to the RFID tags 14 within the sensing zone 16. Although the sensing zone 16 of the present disclosure is limited or restricted to a relatively small space, the RFID reader 12 nonetheless may be configured for bulk reading hundreds or even thousands of RFID tags 14 simultaneously.

The RFID tags 14, 18 may include ID information that is stored as read-only information within the respective RFD tag 14, 18. The ID information may include serial numbers, electronic product codes (EPCs), stock numbers, lot numbers, batch numbers, product numbers, production information, or other identifying information. During the backscattering process, the RFID tag 14 is configured to modulate the H) information into a return signal that can be read by the RFID reader 12.

In some embodiments, the RIM reader 12 may transmit ultra-high frequency (UHF) signals for initiating the backscatter process. The backscatter process is a process that allows a passive RFID tag 14 to communicate signals back to the RFID reader 12 without the use of a power source (e.g., a battery) in the passive RIM reader 12. The electromagnetic (EM) transmission by an antenna of the RFID reader in this scenario includes a sufficient amount of EM energy that is received by the RFID tags 14. This EM energy powers the RI' ID tag 14 to enable the creation of return EM waves carrying the ID information back to the RFID reader 12.

According to some embodiments, the antenna of the RFID reader 12 itself may have properties that allow communication with only the RFID tags 14 within the sensing zone 16. In other embodiments, an antenna system may include physical components (described in more detail below) positioned with respect to an antenna, whereby these physical components may alter the radiation pattern (and consequently the sensing or receiving capabilities) of the antenna. These physical components may also reduce an originally broad radiation pattern of the antenna down to only the sensing zone 16. In still other embodiments, the antenna system of the present disclosure may include both of these radiation pattern limiting features (i.e., a directional antenna in addition to physical components that may further limit the radiation pattern). According to various embodiments of the present disclosure, the RFID reader 12 may utilize UHF waves for electromagnetically communicating with the RFID tags 14.

FIG. 2 is a block diagram showing an embodiment of some of the different parts of the RFID reader 12 shown in FIG. 1. The RFID reader 12 may include, among other things, an antenna 24, referred to herein as a reader antenna. The RFID reader 12 also includes a transceiver 26, processor 28, memory 30, and a database 32. In some embodiments, the transceiver 26 may be configured as a transmitting device and a separate receiving device.

The processor 28 may be configured to execute a program, which may be stored in the memory 30, for providing instructions to the processor 28 regarding the operations of tracking or identifying items. The program may control when the reader antenna 24 transmits interrogation signals to identify any RFID tags 14 within communication range and what is done with the identification responses from the RFID tags 14. The database 32 may be configured to store information regarding the ID data received from the RFID tags 14, when the information was captured, and/or other information. This information can then be used by one or more other programs for managing inventory, determining shipping schedules, tracking items, or other processes that may be performed with the inventory information.

The reader antenna 24, according to some embodiments of the present disclosure, may be configured to have a particular radiation pattern. As mentioned with respect to FIG. 1, the radiation pattern may be directional. For example, the reader antenna 24 may be a sector antenna that may have a predetermined angular range, such as approximately 60 degrees, 90 degrees, 120 degrees, etc., in the horizontal directions. Thus, the reader antenna 24 may include features that naturally distribute and receive electromagnetic waves within a lobed or fanned-shaped range, similar to an antenna system that might include an array of antennas. In addition to the actual antenna structure for creating the limited range, the reader antenna 24 may further include a shroud assembly, as described in more detail below, which may be configured to at least partially limit the radiation pattern or reading zone 16.

In this way, the reader antenna 24 and shroud assembly, when combined, may form an antenna assembly that has a predetermined radiation pattern or sensing/receiving zone.

Such an antenna assembly can then be used to track items only within the specific sensing zone 16 defined by this radiation pattern or modified radiation pattern.

FIG. 3 is a block diagram showing an embodiment of one of the RFID tags 14 for communicating with the RFID reader 12. The RFID tag 14 in this embodiment includes an antenna 36, referred to herein as a tag antenna, a modulator/demodulator 38, a power collector 40, an integrated circuit 42, and an ID memory 44. The modulator/demodulator 38, in some embodiments, may be configured as modulation and demodulation components and/or corresponding transmitting and receiving components.

The modulator/demodulator 38 receives an interrogation signal from the RFID reader 12 via the tag antenna 36 and demodulates the signal. Transmission power received at the tag antenna is provided to the power collector 40 in this passive RFID tag 14. The power collector 40 converts this transmission power to electrical power that can be used to power the integrated circuit (IC) 42. The IC 42 supplies identifying information stored in the ID memory 44 to the modulator/demodulator 38, which modulates the ID information for backscattering a return signal to the RFID reader 12.

In some embodiments, the RFID tag 14 may alternatively be an active device equipped with a power supply, such as a battery. In this case, the power collector 40 of the RFID tag 14 may be omitted, and the RFID tag 14 may rely on the power from the power source. Also, if the RFID tag 14 is configured as an active device, the modulator/demodulator 38 may be configured as a transceiver for transmitting the ID information to the RFID reader 12. Also, the transceiver may be used to transmit the ID information on a periodic basis, according to various embodiments of inventory tracking programs, which may be stored in a memory device. Otherwise, if the RFID tag 14 is a passive device, as illustrated in FIG. 3, the integrated circuit 42 may be configured to send a rely signal only in response to a corresponding interrogation signal from the RFID reader 12.

With respect to FIGS. 2 and 3, the transmission of the interrogation signals communicated from the RFD reader 12 to the RFID tags 14 may be referred to as a forward link. The interrogation signals may be modulated within the UHF range (i.e., between 860 MHz and 960 MHz) and may be configured to energize the passive RFID tags 14, which then communicate return signals, which may be referred to as reverse links, back to the RFID reader 12 by a backscatter modulation process. The backscatter process involves encoding or modulating ID information of the respective MD tag 14 in the return signal, which can then be received, decoded, and processed by the RFID reader 12.

Figure 4:
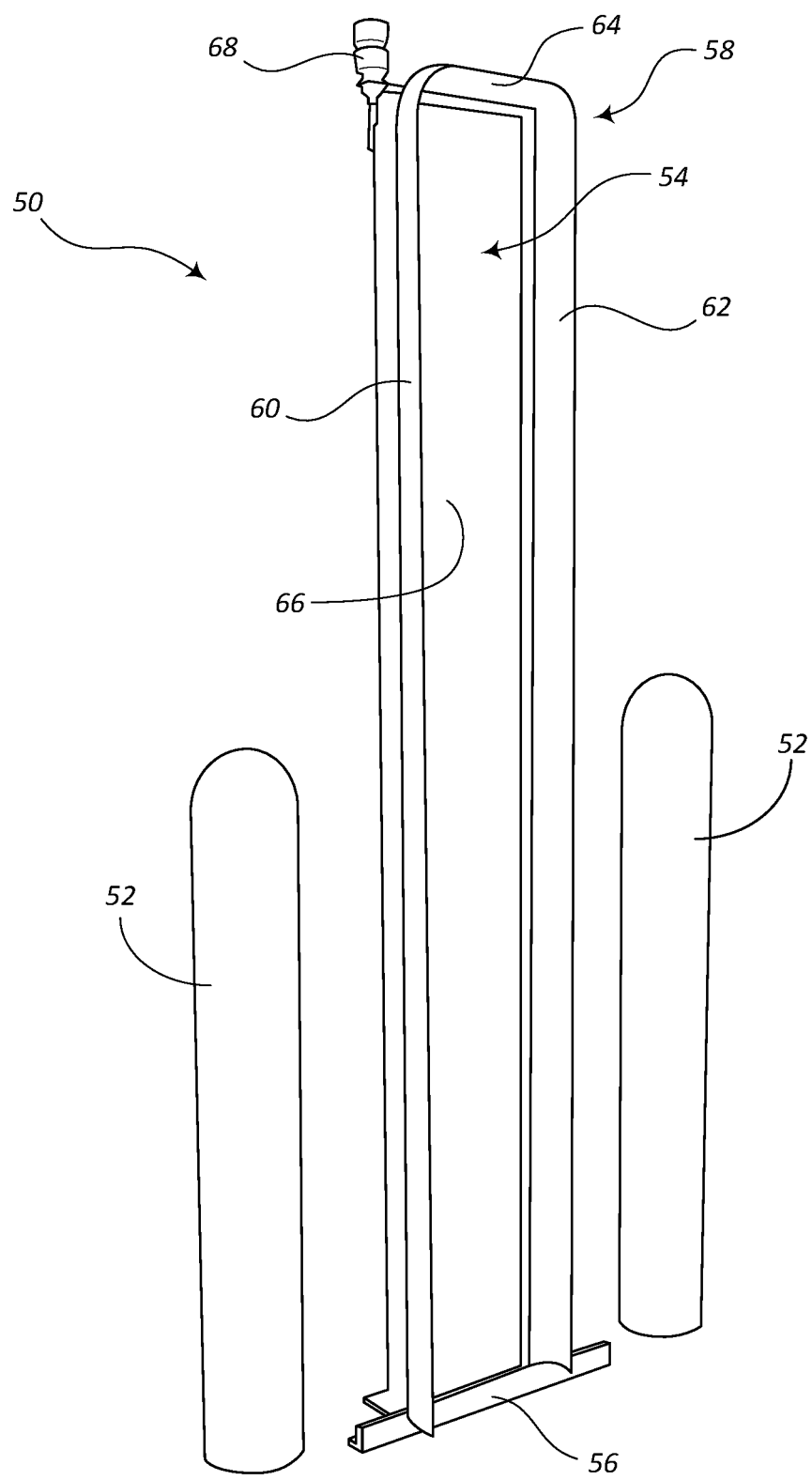
FIG. 4 is a diagram illustrating a perspective view of an RFID reader antenna and shroud assembly, according to various embodiments.

FIG. 4 is a perspective view showing an embodiment of an antenna assembly 50, which may be installed at a stationary or permanent location. In some environments, it may be beneficial to install one or more bollards 52 or other safety bumpers or posts to protect the stationary antenna assembly 50 from accidental contact with forklifts, pallet trucks, scooters, or other moving objects.

The antenna assembly 50 includes an antenna 54, or reader antenna. The antenna 54 may be a planar antenna or sector antenna for creating a radiation pattern within a sector (e.g., fanned-shaped pattern of 60 degree, 90 degree, 120 degree, or other suitable angle, about a horizontal axis). The antenna 54 may be supported in a permanent arrangement on a floor (e.g., the floor of a warehouse) by a base 56. Surrounding the outer edges of the antenna 54 is a shroud assembly 58, including features according to various embodiments of the present disclosure. As illustrated, the shroud assembly 58 may include a left shroud element 60, a right shroud element 62, and a top shroud element 64. In some embodiments, the shroud assembly 58 may further include a bottom shroud element (not shown), which may be positioned near the base 56.

The left shroud element 60 is configured to reduce the EM radiation pattern of the antenna 54, and, in particular, may reduce the EM backscatter radiation that can be sensed at a left side of a fanned-out pattern extending from a front face 66 of the antenna 54. Similarly, the right shroud element 62 is configured to reduce the EM radiation pattern of the antenna 54, and, in particular, may reduce the EM backscatter radiation that can be sensed at a right side of the fanned-out pattern extending from the front face 66 of the antenna 54. In some embodiments, the shroud assembly 58 may include just the left and right shroud elements 60, 62 for limiting the reading zone in only a lateral direction. However, according to other embodiments, the shroud assembly 58 may further include the top shroud element 64, which may be configured to reduce the EM radiation pattern in a vertical direction. Specifically, the top shroud element 64 may limit the height of the EM backscatter radiation sensing pattern to prevent communication with RFID tags 14, 18 on a level (e.g., an upper floor) where interrogation is not wanted.

The antenna assembly 50 may be part of an RFID reader apparatus (e.g., RFID reader 12) and may operate with other elements of the RFID reader apparatus to send interrogation signals to RFID tags within a sensing zone (e.g., sensing zone 16) and then receive ID information from one or more RFID tags. According to some embodiments, the RFID reader apparatus may further include, in addition to the antenna 54 and shroud assembly 58, an indicator 68. The indicator 68 may include one or more lights, an audio output device, and/or other indication elements. In use, the RFID reader may cause the indicator 68 to provide an indication to nearby personnel when the RFID reader is actively in the process of reading RFID tags. The indicator 68 can also indicate when an error has occurred in the reading process and/or that the items need to be read again and may be configured to indicate other activities and/or conditions of the RFID reader.

Thus, the shroud assembly 58 may be configured to control or restrict the reach and/or breadth of the EM waves transmitted by the antenna 54 and the EM backscatter energy received by the antenna 54. The shroud assembly 58 may be specifically designed to constrain the RFID read zone and to eliminate cross reads or stray reads from RFID tags 18 outside the RFID read zone. Therefore, the shroud assembly 58 may be configured to ensure that only the RFID tags 14 within the specific read zone are read and to minimize unwanted RFID tag reads from RFID tags 18 outside the sensing zone 16.

Figure 5:
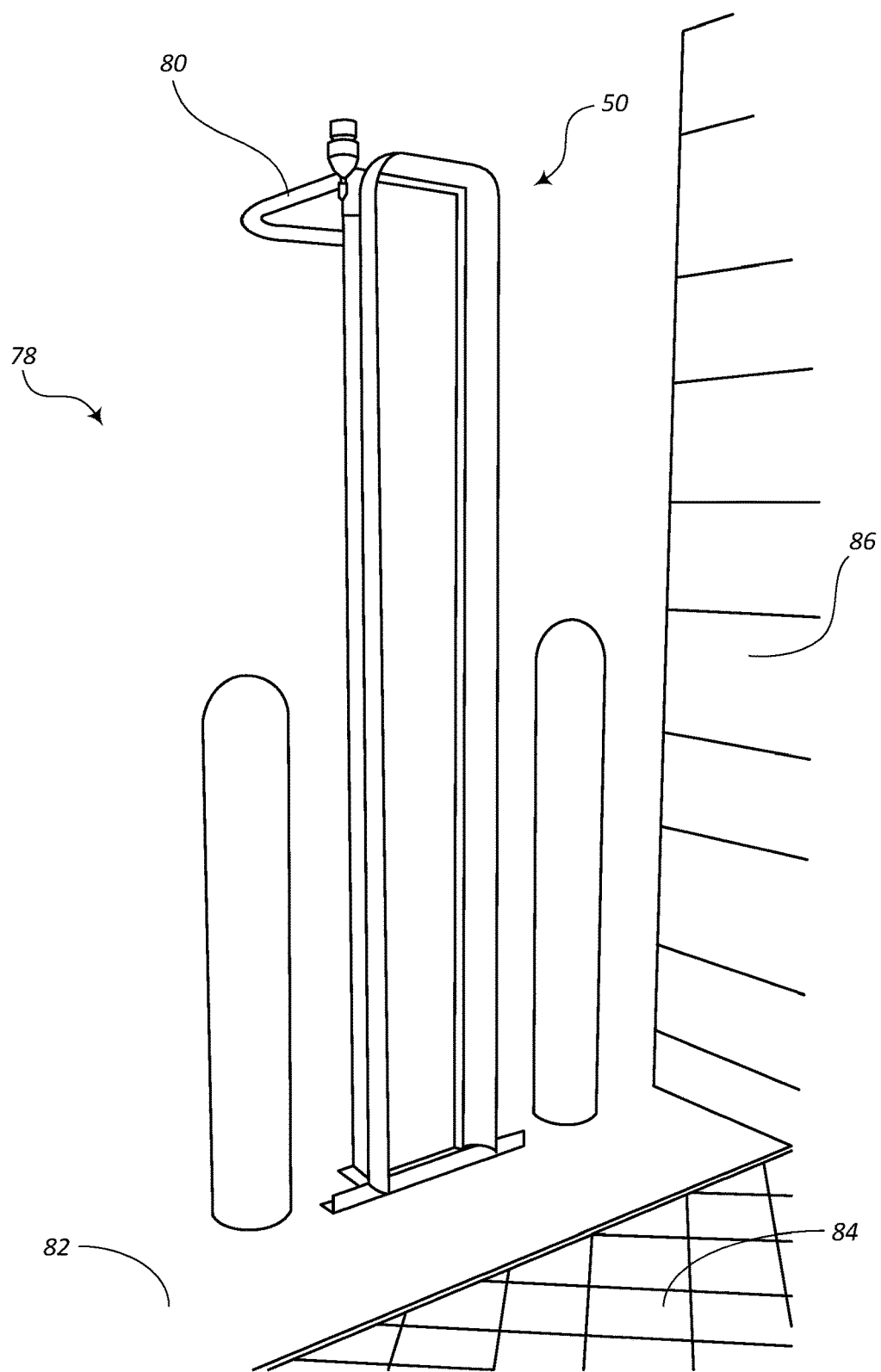
FIG. 5 is a diagram illustrating a perspective view of the RFID reader antenna and shroud assembly of FIG. 4 being used in a warehouse environment, according to various embodiments.

FIG. 5 shows a perspective view of the antenna assembly 50 of FIG. 4 installed in a warehouse environment 78. As shown, the antenna assembly 50 is connected to cables 80 or other electrical conductors for connection with an RFID reader (not shown) and/or power source (not shown). The antenna assembly 50 is installed on a warehouse floor 82 within the warehouse environment 78 and may be positioned with a radiation/sensing pattern that extends out over an area on the warehouse floor 82 which may include an industrial scale 84 or other feature that may be used during a process of shipping or receiving bulk items.

In this environment, a plurality of items may each have an RFID tag and may be brought to a bay 86 in the warehouse environment 78 for loading onto a truck for shipment to a retail store or other location. While the items may be placed on the scale 84 to be weighed, the RFID reader may be configured to transmit interrogations signals within a sensing zone generally corresponding to the space above the scale 84. By restricting the sensing zone created by the antenna 54 and shroud assembly 58, the antenna assembly 50 is thereby configured to exclude other outlying spaces outside the specific electromagnetic radiation pattern.

The multiple RFID tags within the sensing zone can respond with their ID information, which can be recorded by the RFID reader. In some embodiments, an inventory system may include the RFID reading apparatus for identifying items in the sensing zone and may further include the industrial scale 84 for recording the shipping weight of these items. According to various implementations, the sensing zone may be used for recording item information when items are received (imported) at the warehouse environment 78 and/or when items are to be shipped (exported) from the warehouse environment 78. Still other implementations may include other passageways, intersections, thoroughfares, etc., within or associated with the warehouse environment 78 through which the items may pass on their way to another area (e.g., other areas within the same warehouse, from one room to another, etc.). Thus, the antenna assembly 50 may be placed, either permanently or temporarily, at any strategic location (e.g., in front of the bay 86, near a scale 84, or at other locations) where the items can be tracked.

Figure 6:
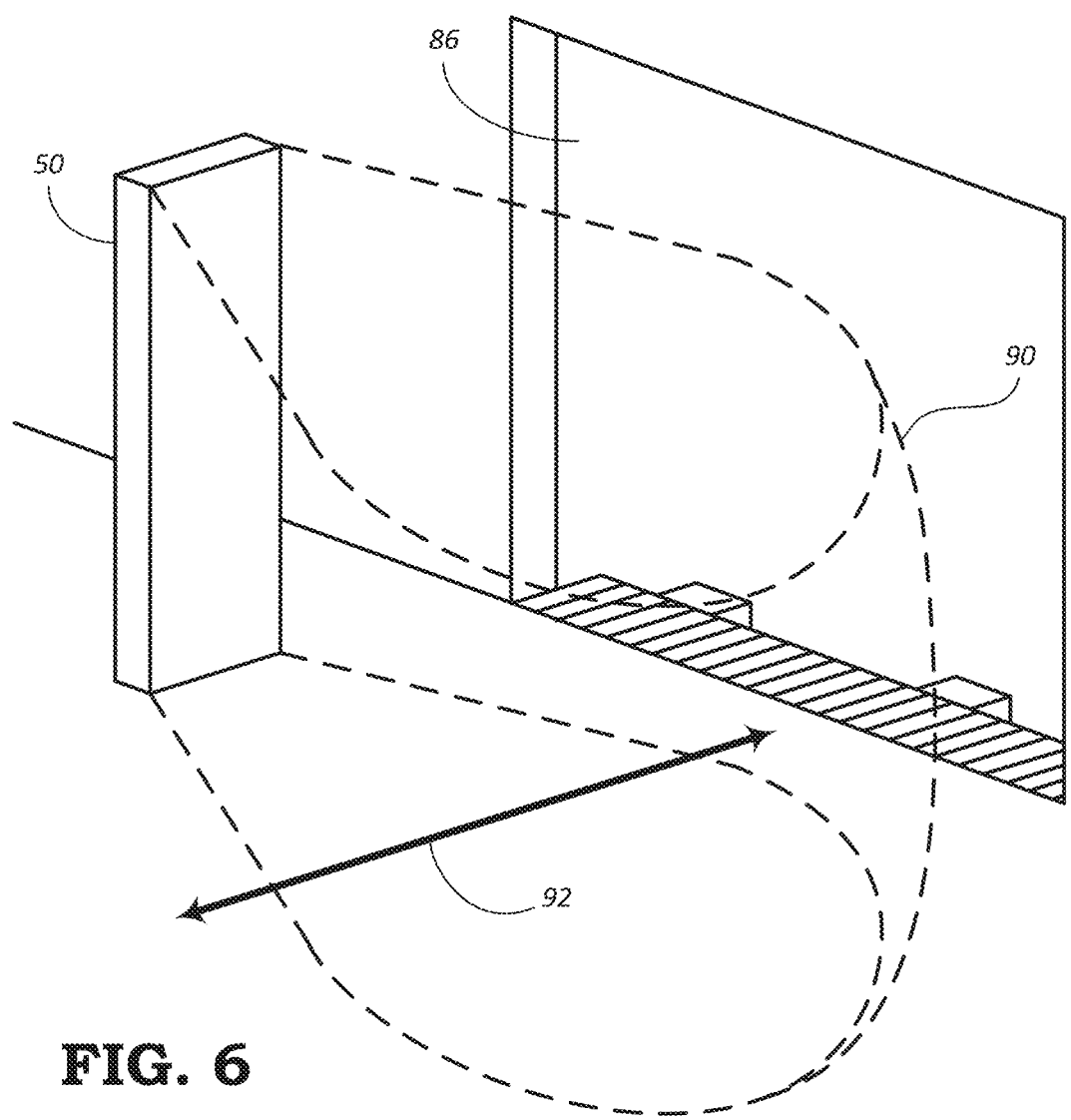
FIG. 6 is a diagram illustrating a perspective view of a limited backscatter sensing zone of the RFID reader antenna and shroud assembly of FIG. 4, according to various embodiments.
Figure 7:
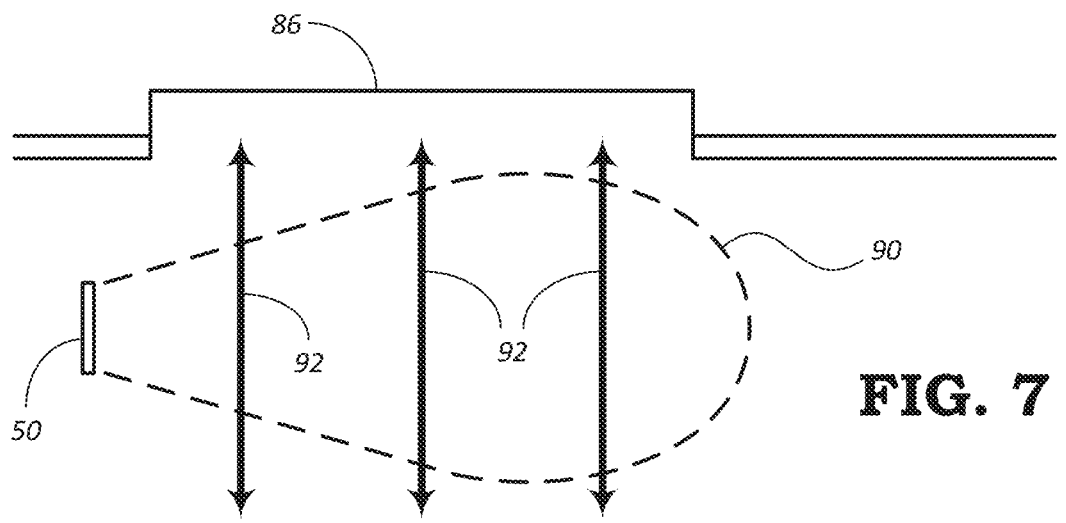
FIG. 7 is a diagram illustrating a top view of the limited backscatter sensing zone of the RFID reader antenna and shroud assembly of FIG. 4, according to various embodiments.

FIG. 6 is a perspective view of a three-dimensional reading zone 90 of the RFID reader antenna assembly 50 shown in FIGS. 4 and 5, which may include a reduced space based on the effects of the shroud assembly 58. Also, FIG. 7 is a diagram showing the reading zone 90 from a top view looking down onto a warehouse floor.

Again, with the directionality features of the antenna itself and/or the effects of the shroud assembly 58, the reading zone 90 may be limited to a space that may be a predefined space where items will normally pass from one location to another. For example, when the items (with RFID tags) are received at the bay 86, the items with pass through the sensing zone 90 and then stored within the warehouse. Also, when items stored at the warehouse are loaded onto a truck or other delivery vehicle, the items may pass through the sensing zone 90 in the opposite direction. A user may provide information to the RFID tracking system to indicate the direction that items are moving. A path of travel 92 is indicated in FIGS. 6 and 7 and shows a route of items through the warehouse, and may be based at least on the design of the warehouse and the normal path that items will follow. In other embodiments, the path 92 may include an assembly line (e.g., an automotive manufacturing assembly line) or some other path where the items may normally travel.

Figure 8:
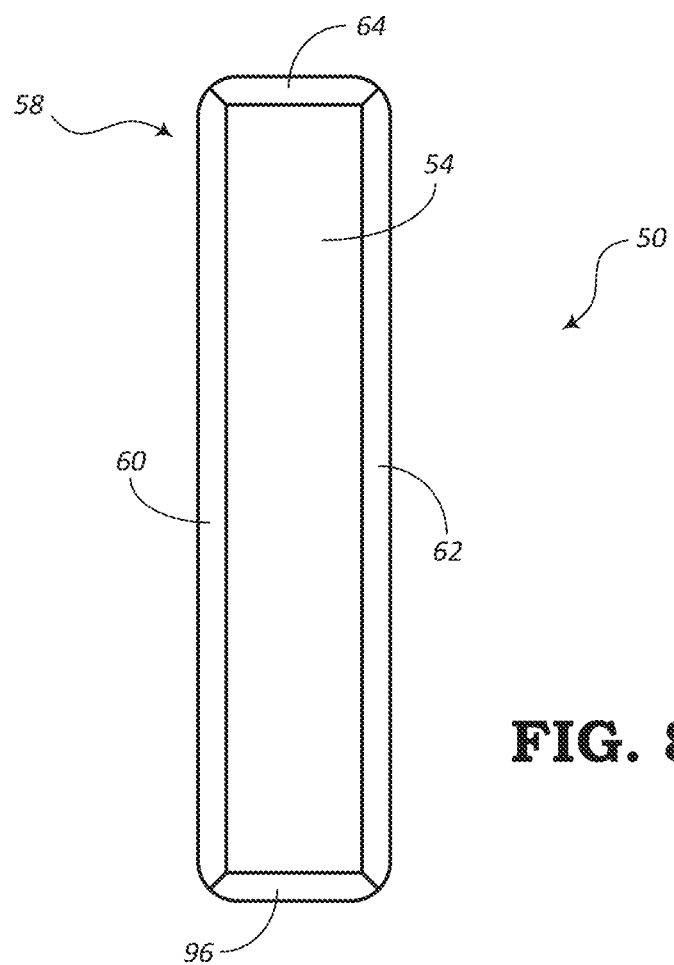
FIG. 8 is a diagram illustrating a front view of the RFID reader antenna and shroud assembly of FIG. 4, according to various embodiments.

FIG. 8 is a diagram illustrating a front view of an embodiment of the antenna assembly 50, including the RFID reader antenna 54 and shroud assembly 58. In this embodiment, the shroud assembly 58 includes the left shroud element 60, the right shroud element 62, and the top shroud element, as described above with respect to FIG. 4. However, in this embodiment, the shroud assembly 58 may further include a bottom shroud element 96 that may be configured to limit the electromagnetic radiation (and backscatter return energy) in a downward direction. The bottom shroud element 96 may help to limit the vertical range so that unwanted RFID tags that are located below the level of the antenna assembly 50 (e.g., on a lower floor) will not be within the sensing zone 90. Thus, greater control over the vertical EM range can also be achieved.

The shroud assembly 58 may include one or more parabolic reflectors that include a parabolic shape taken in a cross-section at any point along a length of the various shroud elements 60, 62, 64, 96. The parabolic reflectors are configured to collimate EM beams along an axis defined by the antenna 54 and focus the sensing zone to a narrow space of focused projected RFID energy. The shroud assembly 58 may also be configured to help the antenna 54 collect focused received energy from a greater distance from RFID tags 14 substantially parallel to an axis perpendicular to the face 66 of the antenna 54. The shroud assembly 58 thus reflects signals from these parallel points to focus the EM backscatter energy to points on the antenna 54. Thus, utilizing the shroud assembly 58 may result in a significant reduction in the amount of energy required to read RFID tags within the sensing zone 16, 90, whereby the reading process involves both the focused transmission of RFID energy from the RFID reader 12 and the capturing of focused backscatter energy from the RFID tags 14.

Figure 9:
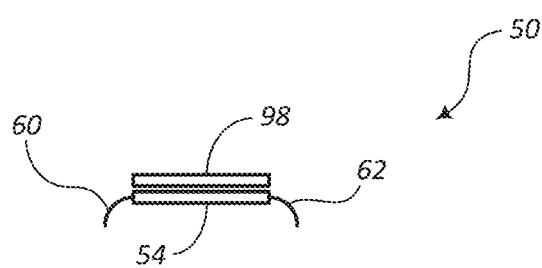
FIG. 9 is a diagram illustrating a cross-sectional top view of the RFID reader antenna and shroud assembly of FIG. 4, according to various embodiments.

FIG. 9 shows a cross-section of the reader antenna assembly 50 from a top view. The left shroud element 60 is shown having a cross-sectional profile having a concave configuration (i.e., concave from a front perspective). In one embodiment, the cross-sectional profile of the left shroud element 60 may be a quarter-circle. With respect to the entire length of the left shroud element 60, the left shroud element 60 may thereby have a quarter-pipe configuration. In other embodiments, the concaved left shroud element 60 may include a parabolic cross-sectional profile, which may reduce the radiation transmission and backscatter sensing range to a very narrow pattern (e.g., a pattern being substantially planar in the vertical direction with respect to points along the width of the antenna 54).

Similarly, the right shroud element 62 is shown having a cross-sectional profile having a concave configuration (i.e., concave from a front perspective). In one embodiment, the cross-sectional profile of the right shroud element 62 may be a quarter-circle. With respect to the entire length of the right shroud element 62, the right shroud element 62 may thereby have a quarter-pipe configuration. In other embodiments, the concaved right shroud element 62 may include a parabolic cross-sectional profile, which may reduce the radiation transmission and backscatter sensing range to a very narrow pattern (e.g., a pattern being substantially planar in the vertical direction with respect to points along the width of the antenna 54).

In addition, the reader antenna assembly 50 may further include a back shield 98 configured to block or absorb radiation that may leak from the back of the antenna 54 in order to primarily restrict the radiation pattern to the front of the antenna 54.

Therefore, according to various embodiments of the present disclosure, a system for identifying items is provided. For example, the item identifying system may include an RFID reader (e.g., RFID reader 12) having a reader antenna (e.g., reader antenna 24, 54) configured to transmit an interrogation signal. The system may further include a plurality of RFID tags (e.g., RFID tags 14), where each RFID tag 14 is configured to be attached to a respective item to be identified. Each RFID tag 14 may include a tag antenna (tag antenna 36) configured to receive the interrogation signal. In response to receiving the interrogation signal, the RFID tag 14 may provide a response representing an ID of the respective RFID tag 14. The system may further include a shroud assembly (e.g., shroud assembly 58) surrounding at least a portion of the reader antenna 24, 54. The shroud assembly 58 may be configured to reduce the size of a backscatter sensing, reading, or receiving zone 16, 90 defining a space from which a backscatter signal from a respective tag antenna of one or more of the RFID tags 14 can be sensed by the reader antenna 24, 54 of the RFID reader 12.

Furthermore, the above-described system may also be defined such that the shroud assembly 58 includes at least one concave member (e.g., one of members 60, 62, 64, 96). The at least one concave member may include a parabolic cross-sectional profile or a quarter pipe structure. The shroud assembly 58 may include at least one of a left-side shroud member (e.g., left shroud member 60) configured to reduce the size of the backscatter sensing zone 90 towards the left side of the reader antenna 54 and a right-side shroud member (e.g., right shroud member 62) configured to reduce the size of the backscatter sensing zone 90 towards the right side of the reader antenna 54. The shroud assembly 58 may further include a top-side shroud member (e.g., top shroud member 64) configured to reduce the size of the backscatter sensing zone 90 towards the top side of the reader antenna 54 and/or a bottom-side shroud member (e.g., bottom shroud member 96) configured to reduce the size of the backscatter sensing zone 90 towards the bottom side of the reader antenna 54.

The reader antenna 54 may be a substantially planar antenna member having a front side 66, where the backscatter sensing zone 90 may be fanned-shaped and directed similar to a radiation pattern substantially perpendicular with a face of the front side 66 of the substantially planar antenna member 54. The shroud assembly 58 may be configured to reflect electromagnetic radiation from the reader antenna 54 to thereby provide a horizontally narrower backscatter sensing zone 90. The shroud assembly 58 may further be configured to direct electromagnetic backscatter radiation from tag antennas 36 of one or more of the plurality of RFID tags 14 within the horizontally narrower backscatter sensing zone 90 toward the reader antenna 54 of the RFID reader 12 while blocking electromagnetic backscatter radiation from tag antennas 36 of one or more of the plurality of RFID tags 18 outside the horizontally narrower backscatter sensing zone 16, 90. In some embodiments, the reader antenna 54 may be stationary and may be directed to the backscatter sensing zone 16, 90 through which a number of items to be identified are configured to pass (e.g., via path 92).

According to various embodiments of the present disclosure, an antenna assembly is also provided. For example, the antenna assembly (e.g., antenna assembly 50) may include a directional antenna 54 having a fanned-shaped radiation pattern 90. The antenna assembly 50 may further include the right shroud element 62 configured to reduce a right side of the fanned-shaped radiation pattern 90 and the left shroud element 60 configured to reduce a left side of the fanned-shaped radiation pattern 90.

This antenna assembly 50 described above may further be defined whereby the right shroud element 62 and the left shroud element 60 are configured to reflect electromagnetic radiation from the directional antenna 54 to thereby provide a horizontally narrower fanned-shaped radiation pattern 90. The right shroud element 62 and the left shroud element 60 are configured to direct electromagnetic radiation from a first RFID tag 14 within a reading zone defined by the horizontally narrower fanned-shaped radiation pattern 16, 90 toward the directional antenna 24, 54 while blocking electromagnetic radiation from a second RFID tag 18 outside the reading zone 16, 90. The antenna assembly 50 may be utilized by an RFID reader (e.g., RFID reader 12), whereby the directional antenna 54 may be configured to transmit an interrogation signal to a plurality of RFID tags 14. The right shroud element 62 and left shroud element 60 are configured to reduce the size of the backscatter sensing zone 16, 90 in which the directional antenna 54 is capable of receiving backscatter radiation from one or more of the RFID tags 14. At least one of the right shroud element 62 and the left shroud element 60 may include a concave cross-sectional profile. The concave cross-sectional profile may be a parabolic cross-sectional profile and/or a quarter circle cross-sectional profile. The antenna assembly 50 may further include a top-side shroud member (e.g., top shroud member 64) configured to reduce the height of the backscatter sensing zone 90. The directional antenna 54 may include a substantially planar antenna member having a front side 66, where the fanned-shaped radiation pattern or backscatter sensing zone 90 extends substantially perpendicularly from a face of the front side 66 of the substantially planar antenna member 54.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system for identifying items, the system comprising:
a radio-frequency identification (RFID) reader having a reader antenna configured to transmit an interrogation signal;
a plurality of RFID tags, each RFID tag configured to be attached to a respective item to be identified, each RFID tag including a tag antenna configured to receive the interrogation signal and, in response to receiving the interrogation signal, provide an identification (ID) response representing an identity of the respective RFID tag; and
a shroud assembly connected to the reader antenna, the shroud assembly configured to reduce the size of a backscatter sensing zone defining a space from which a backscatter signal from a respective tag antenna of one or more of the RFID tags can be sensed by the reader antenna of the RFID reader;
wherein the shroud assembly is configured to reduce the size of the backscatter sensing zone by reducing a width of backscatter sensing zone without blocking the backscatter sensing zone in a direction extending orthogonally from the reader antenna.

2. The system of claim 1, wherein the shroud assembly includes at least one concave member.

3. The system of claim 2, wherein the at least one concave member includes a parabolic cross-sectional profile.

4. The system of claim 2, wherein the at least one concave member includes a quarter pipe structure.

5. The system of claim 1, wherein the shroud assembly includes at least one of a left-side shroud member configured to reduce the size of the backscatter sensing zone towards the left side of the reader antenna and a right-side shroud member configured to reduce the size of the backscatter sensing zone towards the right side of the reader antenna.

6. The system of claim 5, wherein the shroud assembly further includes at least one of a top-side shroud member configured to reduce the size of the backscatter sensing zone towards the top side of the reader antenna and a bottom-side shroud member configured to reduce the size of the backscatter sensing zone towards the bottom side of the reader antenna.

7. The system of claim 1, wherein the reader antenna includes a substantially planar antenna member having a front side, wherein the backscatter sensing zone is fan-shaped and directed in a radiation pattern substantially perpendicular with a face of the front side of the substantially planar antenna member.

8. The system of claim 7, wherein the shroud assembly is configured to reflect electromagnetic radiation from the reader antenna to thereby provide a horizontally narrower backscatter sensing zone.

9. The system of claim 8, wherein the shroud assembly is configured to direct electromagnetic backscatter radiation from one or more tag antennas of one or more of the plurality of RFID tags within the horizontally narrower backscatter sensing zone toward the reader antenna of the RFID reader while blocking electromagnetic backscatter radiation from one or more tag antennas of one or more of the plurality of RFID tags outside the horizontally narrower backscatter sensing zone.

10. The system of claim 1, wherein the reader antenna is stationary and is directed to the backscatter sensing zone through which a number of items to be identified are configured to pass.

11. An antenna assembly comprising:
a directional antenna providing an electromagnetic radiation pattern that extends from the directional antenna substantially in a first direction, wherein the electromagnetic radiation pattern includes a fan-shaped lobe having side edges; and
one or more shroud elements connected to the directional antenna, each shroud element configured to horizontally narrow a side edge of the fan-shaped lobe with blocking the electromagnetic radiation pattern in the first direction, wherein horizontally narrowing the side edge of the fan-shaped lobe creates a backscatter sensing zone;
wherein the antenna assembly is unshielded in the first direction to allow an item with an attached radio-frequency identification (RFID) tag to pass through the backscatter sensing zone unimpeded.

12. The antenna assembly of claim 11, wherein the right shroud element and the left shroud element are configured to direct electromagnetic backscatter radiation from a first radio-frequency identification (RFID) tag within a backscatter sensing zone defined by the horizontally narrower fan-shaped radiation pattern toward the directional antenna while blocking electromagnetic backscatter radiation from a second RFID tag outside the backscatter sensing zone.

13. The antenna assembly of claim 11, wherein the antenna assembly is utilized by a radio-frequency identification (RFID) reader, wherein the directional antenna is configured to transmit an interrogation signal to a plurality of RFID tags.

14. The antenna assembly of claim 13, wherein the one or more shroud elements are configured to reduce the size of a backscatter sensing zone defining a space from which a backscatter signal from one or more of the RFID tags can be sensed by the directional antenna.

15. The antenna assembly of claim 11, wherein the one or more shroud elements include a concave cross-sectional profile.

16. The antenna assembly of claim 15, wherein the concave cross-sectional profile is a parabolic cross-sectional profile.

17. The antenna assembly of claim 15, wherein the concave cross-sectional profile is a quarter circle cross-sectional profile.

18. The antenna assembly of claim 11, further comprising a top-side shroud member configured to reduce the height of the radiation pattern.

19. The antenna assembly of claim 11, wherein the directional antenna includes a substantially planar antenna member having a front side, wherein the fan-shaped radiation pattern extends substantially perpendicularly from a face of the front side of the substantially planar antenna member.

20. The antenna assembly of claim 19, wherein the substantially planar antenna member has a height and a width, and wherein the height is at least twice the width.

* * * * *

UNITED STATES PATENT AND TRADEMARK OFFICE
CERTIFICATE OF CORRECTION

| | |
|---|---|
| PATENT NO. | : 10,891,450 B2 |
| APPLICATION NO. | : 16/411239 |
| DATED | : January 12, 2021 |
| INVENTOR(S) | : William Wappler |

It is certified that error appears in the above-identified patent and that said Letters Patent is hereby corrected as shown below:

On the Title Page

Item (73) Assignee Information:
Correct Assignee's name from "SURGERE, INC." to -- SURGERE, LLC --

Signed and Sealed this
Thirtieth Day of August, 2022

Katherine Kelly Vidal
*Director of the United States Patent and Trademark Office*